(12) United States Patent
Milleth et al.

(10) Patent No.: US 10,122,426 B2
(45) Date of Patent: Nov. 6, 2018

(54) METHOD FOR BEAM STEERING IN MULTIPLE-INPUT MULTIPLE-OUTPUT SYSTEM

(71) Applicants: Centre of Excellence in Wireless Technology, Chennai (IN); Indian Institute of Technology Madras, Chennai (IN)

(72) Inventors: Jeniston Deviraj Klutto Milleth, Chennai (IN); Chandrasekaran Mohandoss, Chennai (IN); Sendilramkumar Devar, Chennai (IN); Thulasiram Jonna, Chennai (IN); Abhijeet Masal, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS, Chennai (IN)

( * ) Notice: Subject to any disclaimer, the term of this patent is extended or adjusted under 35 U.S.C. 154(b) by 0 days.

(21) Appl. No.: 15/204,477

(22) Filed: Jul. 7, 2016

(65) Prior Publication Data
US 2017/0026094 A1    Jan. 26, 2017

(30) Foreign Application Priority Data

Jul. 20, 2015 (IN) .......................... 3728/CHE/2015

(51) Int. Cl.
*H04B 7/04* (2017.01)
*H04B 7/0456* (2017.01)

(52) U.S. Cl.
CPC .................................. *H04B 7/0456* (2013.01)

(58) Field of Classification Search
CPC ....................................................... H04B 7/04
See application file for complete search history.

(56) References Cited

U.S. PATENT DOCUMENTS

| 2010/0255790 | A1* | 10/2010 | Farajidana | H04B 7/0695 |
| | | | | 455/69 |
| 2012/0098694 | A1* | 4/2012 | Hansen | G01S 13/4454 |
| | | | | 342/154 |
| 2016/0065290 | A1* | 3/2016 | Zhu | H04W 52/0209 |
| | | | | 370/329 |

* cited by examiner

*Primary Examiner* — Jaison Joseph

(57) ABSTRACT

Embodiments herein provide a method for beam steering in a Multiple Input Multiple Output (MIMO) system. The method includes steering a transmit beam using a precoder matrix determined based on a plurality of parameters, wherein the transmit beam is formed using at least one of a weight of each antenna element, a number of antenna elements, and an inter-antenna element spacing.

16 Claims, 7 Drawing Sheets

METHOD FOR BEAM STEERING IN MULTIPLE-INPUT MULTIPLE-OUTPUT SYSTEM

TECHNICAL FIELD

The present invention generally relates to wireless communication systems and more particularly to a method for beam steering in a Multiple Input Multiple Output (MIMO) system. The present application is based on, and claims priority from an Indian Application Number 3728/CHE/2015 filed on 20 Jul. 2015, the disclosure of which is hereby incorporated by reference.

BACKGROUND

Radio spectrum is a very scarce resource due to its limited availability for cellular communications and demand for very high data rate applications, which is growing exponentially. Frequency reuse utilizes the available radio resources efficiently by using same frequency spectrum in multiple cells which are geographically located at different places. Further, the frequency reuse is a preferred mode of deployment where each sector uses entire available frequency resources thus, introducing co-channel interference (CCI) and severely affecting users at a boundary between cells. Also, more number of antennas at a receiver can cancel or suppress the interference from co-channels, which in turn increases spectral efficiency.

MIMO is another technology that can help in increasing capacity of a wireless system for a given bandwidth and power; this is the key reason for using the MIMO technique in technologies such as Long Term Evaluation (LTE), Worldwide Interoperability for Microwave Access (Wi-MAX), and Wireless Fidelity (Wi-Fi). Further, the MIMO can be classified into two types such as a single-user MIMO (SU-MIMO) and a multi-user MIMO (MU-MIMO). In case of the SU-MIMO, multiplexed data streams belong to same receiver and rank adaptation offers the possibility to dynamically adapt a number of data streams for the receiver to current channel conditions. Further, multiple antennas can also be used to increase the diversity by transmitting multiple copies of same information. At the receiver, by appropriately combining of these replicas, a more reliable reception can be achieved.

In case of third generation (3G) or fourth generation (4G) technologies, as the operating frequency is in hundreds of MHz, independent channel realizations can be obtained with sufficient spacing between the antennas. Since space is less of a constraint at a base station (BS), deploying the multiple antennas at the BS is simple. However, the deployment of multiple antennas at the receiver can be a challenge due to the small device form factor, cost, and complexity issues. Therefore, the number of spatial dimensions of the SU-MIMO that can be exploited is limited by the number of antennas at the receiver.

To overcome the above limitations, the antennas of the receivers located in different geographic locations can be treated as a part of a larger MIMO, and same time-frequency resources are shared by more than one receiver belonging to multiple users located in different geographical locations. This type of the MU-MIMO improves the overall system throughput by increasing spectral efficiency instead of per receiver peak throughput. Further, the performance of the MU-MIMO mainly depends on the scheduling technique. However, the receivers scheduled for the MU-MIMO still experience multi-user interference when Channel State Information (CSI) is outdated or when users experience non orthogonal channel between them.

The above information is presented as background information only to help the reader to understand the present invention. Applicants have made no determination and make no assertion as to whether any of the above might be applicable as Prior Art with regard to the present application.

SUMMARY

Embodiments herein provide a method for beam steering in a MIMO system. The method includes steering, by a transmitter, a transmit beam using a precoder matrix determined based on a plurality of parameters, where the transmit beam is formed using at least one of a weight of each antenna element, a number of antenna elements, and an inter-antenna element spacing.

In an embodiment, the parameter is at least one of a width, a direction, a gain, a location of at least one receiver, at least one Channel Quality Indicator (CQI), at least one Channel State Information (CSI), and interference information.

In an embodiment, the width, the direction, and the gain is determined using the location of the at least one receiver.

In an embodiment, the precoder matrix includes a weight vector of an appropriate size, where the weight vector includes the weight of each of the antenna elements.

In an embodiment, where the inter-antenna element spacing is achieved based on a selection of the antenna elements.

In an embodiment, at least one of the number of antenna elements and each of the antenna elements of the number of antenna elements are selected based on at least one of the location of the at least one receiver, the at least one CSI, and the at least one CQI.

In an embodiment, the antenna elements are arranged in a two-dimensional array to create multiple beams within a coverage area.

In an embodiment, the precoder matrix is static or semi-static.

In an embodiment, the precoder matrix is changed dynamically.

Accordingly the embodiments herein provide a method for beam steering in a MIMO system. The method includes obtaining, by a transmitter, at least one of at least one CQI, at least one CSI, at least one optimal transmit beam selected by at least one receiver, and a location of the at least one receiver. Further, the method includes steering, by the transmitter, at least one transmit beam based on at least one of the at least one CQI, the at least one CSI, the at least one optimal transmit beam reported by the at least one receiver, and the location of the at least one receiver, where the at least one transmit beam is formed using at least one of a weight of each antenna element, a number of antenna elements, and an inter-antenna element spacing.

In an embodiment, the at least one transmit beam is steered based on a precoder matrix determined based on a plurality of parameters.

In an embodiment, steering the at least one transmit beam includes forming at least one sub beam within the at least one transmit beam based on at least one precoder matrix and at least one of the at least one CQI, at least one CSI, and the optimal transmit beam reported by the at least one receiver.

In an embodiment, steering the at least one transmit beam from the plurality of transmit beams including combining at least two transmit beams based on the at least one precoder matrix.

In an embodiment, the precoder matrix is dynamically cycled within an allocated resource.

In an embodiment, the receiver selects the optimal beam based on the at least one CQI.

In an embodiment, the at least one transmit beam, from the plurality of transmit beams, associated with the at least one receiver is transmitted more frequently, where the at least one transmit beam, from the plurality of transmit beams, not associated with the at least one receiver is transmitted less frequently.

Accordingly the embodiments herein include a transmitter for beam steering in a MIMO system. The transmitter includes a memory, and a processor coupled to the memory. The processor is configured to steer a transmit beam using a precoder matrix determined based on a plurality of parameters, where the transmit beam is formed using at least one of a weight of each antenna element, a number of antenna elements, and an inter-antenna element spacing.

Accordingly the embodiments herein include a transmitter for beam steering in a MIMO system. The transmitter includes a memory, and a processor coupled to the memory. The processor is configured to obtain at least one of at least one CQI, at least one CSI, at least one optimal transmit beam selected by at least one receiver, and a location of the at least one receiver. Further, the processor is configured to steer at least one transmit beam based on at least one of the at least one CQI, at least one CSI, the at least one optimal transmit beam reported by the at least one receiver, and the location of the at least one receiver, where the at least one transmit beam is formed using at least one of a weight of each antenna element, a number of antenna elements, and an inter-antenna element spacing.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications can be made within the scope of the embodiments herein without departing from the spirit thereof, and the embodiments herein include all such modifications.

The principal object of the embodiments herein is to provide a method for beam steering in a MIMO system.

Another object of the embodiments herein is to provide a system and method thereof for steering, by a transmitter, a transmit beam using a precoder matrix determined based on a plurality of parameters, where the transmit beam is formed using at least one of a weight of each antenna element, a number of antenna elements, and an inter-antenna element spacing.

Yet another object of the embodiments herein is to provide a system and method thereof for obtaining, by the transmitter, at least one of at least one Channel Quality Indicator (CQI), at least one Channel State Information (CSI), at least one optimal transmit beam selected by at least one receiver, and a location of the at least one receiver.

Yet another object of the embodiments herein is to provide a system and method thereof for steering, by the transmitter, at least one transmit beam based on at least one of the at least one CQI, the at least one CSI, the at least one optimal transmit beam reported by the at least one receiver, and the location of the at least one receiver, where the at least one transmit beam is formed using at least one of the weight of each antenna element, the number of antenna elements, and the inter-antenna element spacing.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
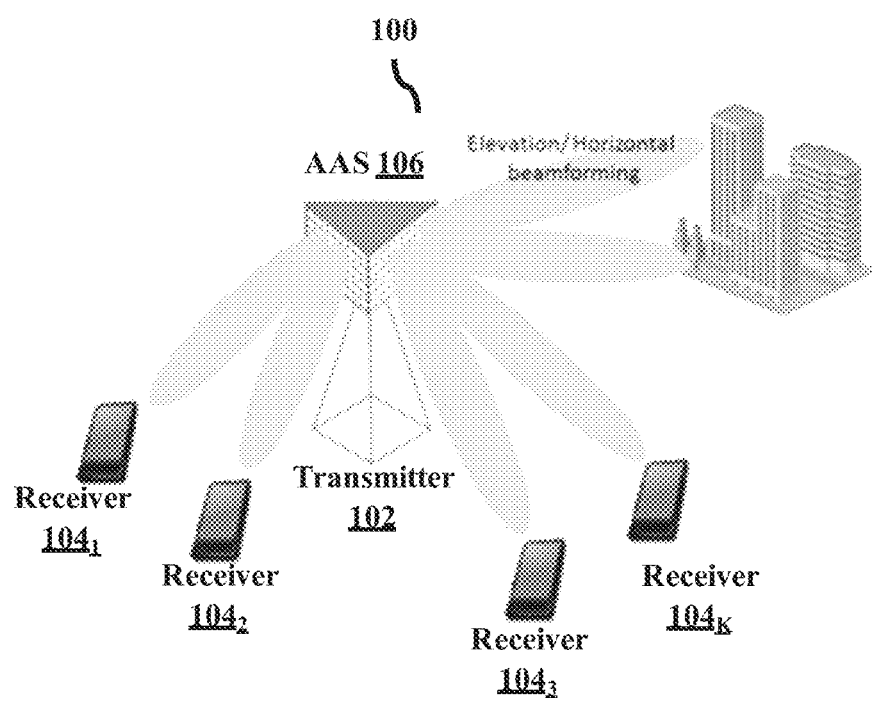
FIG. 1 illustrates a high level overview of a MIMO system for beam steering when a location of at least one receiver is known to a transmitter, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for beam steering in a MIMO system. The method includes steering a transmit beam using a precoder matrix determined based on a plurality of parameters, where the transmit beam is formed using at least one of a weight of each antenna element, a number of antenna elements, and an inter-antenna element spacing.

Another embodiment herein discloses a method for beam steering in the MIMO system. The method includes obtaining at least one of at least one CQI, at least one CSI, at least one optimal transmit beam selected by at least one receiver, and a location of the at least one receiver. Further, the method includes steering at least one transmit beam based on at least one of the at least one CQI, the at least one CSI, the at least one optimal transmit beam reported by the at least one receiver, and the location of the at least one receiver, where the at least one transmit beam is formed using at least one of the weight of each antenna element, the number of antenna elements, and the inter-antenna element spacing.

Unlike conventional methods and systems, multiple beams within a sector area are of great interest, and referred as Virtual sectorization. This feature can be exploited to have better control on a direction and a width of the antenna beam with respect to the receiver. Thus, achieving maximum array gain which reduces co-channel interference (CCI) resulting in overall gain in the system throughput.

Referring now to the drawings, and more particularly to FIGS. 1 through 9, where similar reference characters denote corresponding features consistently throughout the figures, there are shown preferred embodiments.

FIG. 1 illustrates a high level overview of a MIMO system 100 for beam steering when a location of at least one receiver is detected by a transmitter, according to an embodiment as disclosed herein. In an embodiment, the MIMO system 100 includes the transmitter 102, a plurality of receivers $104_{1-K}$ (here after referred as the receiver(s) 104), and an Active Antenna System (AAS) 106. In an embodiment, the transmitter 102 can be a base station. In an embodiment, the receiver 104 can be a user equipment (UE). The AAS 106 includes a plurality of antenna elements arranged in a two dimensional array with each element or sub-array of elements integrated with an amplifier and other beam forming components.

The transmitter 102 can be configured to steer at least one transmit beam using a precoder matrix determined based on a plurality of parameters, where the transmit beam is formed using at least one of a weight of each antenna element, a number of antenna elements, and an inter-antenna element spacing. In an embodiment, the parameter is at least one of a width, a direction, a gain, a location of the receiver 104, at least one CQI, at lease one CSI, and interference information. In an embodiment, the width, the direction, and the gain are determined based on the location of the receiver 104. In an embodiment, the precoder matrix is static or semi-static. In an embodiment, the precoder matrix is changed dynamically.

In an embodiment, weighting vectors (i.e., the precoder matrix) on the antenna elements can be changed based on a horizontal and a vertical tilt, where the horizontal and the vertical tilt can be computed using the location coordinates of the receiver 104. In an example, the location of the receiver 104 can be achieved by existing position identification mechanisms. Further, the transmit beam can be tilted to a desired direction by appropriately combining the weights. Strategy may include CCI reduction, inter-stream interference reduction, side lobe suppression, multiple lobe formation, or the like. Further, the beam formation weight vectors can be calculated based on either virtual sub sectoring of original sector or based on the location of the receiver 104. In an example, LTE release 11 onwards supports the multiple CSI processes for transmitting reference signals. The CSI process is configured based on the location of the receiver 104 and the transmit beam direction.

In an embodiment, the number of antenna elements and each antenna element from the number of antenna elements are selected based on at least one of the location of the receiver 104, the at least one CSI, and the at least one CQI. The CSI information is obtained based on an uplink reference signal including a channel feedback or a downlink reference signal including a channel feedback. The at least one parameter of the at least one antenna element is configured before a signal is being transmitted by the transmitter 102. In an embodiment, the at least one parameter of the at least one antenna element are configured at a Radio Frequency (RF) level or a baseband level.

The FIG. 1 shows a limited overview of the MIMO system 100 but, it is to be understood that another embodiment is not limited thereto. Further, the MIMO system 100 can include different units communicating among each other along with other hardware or software components.

Figure 2:
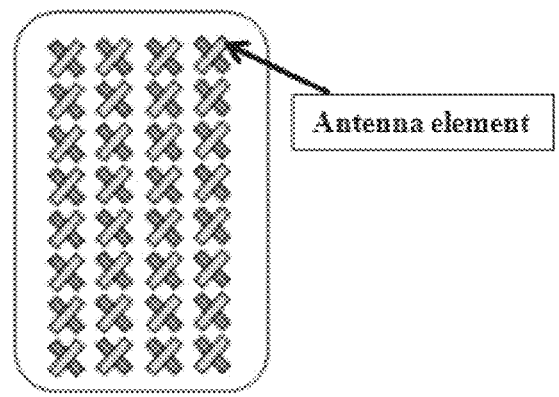
FIG. 2 illustrates an example structure of an Active Antenna System (AAS) with cross polarized antenna elements, according to an embodiment as disclosed herein.

FIG. 2 shows an example AAS structure 106 with the cross polarized antenna elements for 8×4 rectangular arrays, according to an embodiment as disclosed herein. The group of one or more antenna elements forms a Transmitter Receiver Unit (TXRU).

Figure 3:
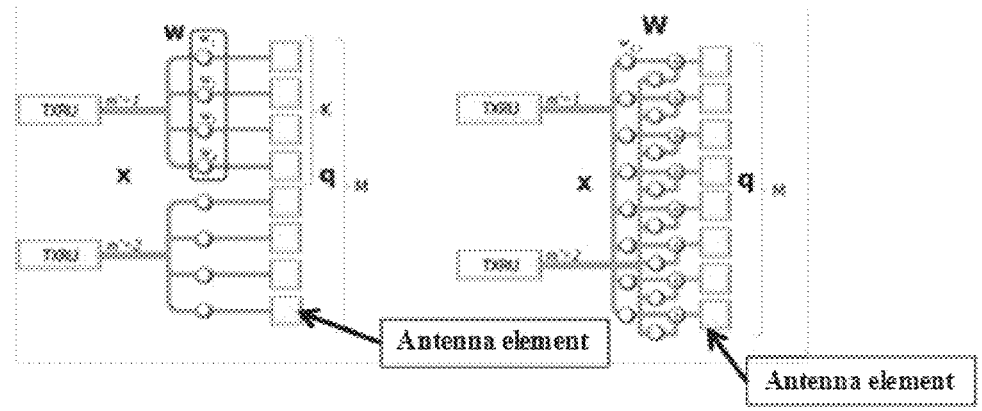
FIG. 3 illustrates a structure of a Transmitter Receiver Unit (TXRU) using a sub-array and full connection models, according to an embodiment as disclosed herein.

FIG. 3 illustrates a structure of the TXRU using sub-array and full connection models, according to an embodiment as disclosed herein. Here, "W" indicates a weight vector, "M" is total number of the antenna elements in the AAS 106, "K" is the number of antenna elements in a particular TXRU, and "Q" is total number of TXRUs. The AAS 106 provides element level control for applying weight vectors or the precoder matrices.

In an embodiment, azimuth as well as zenith RF tilt can be controlled dynamically, semi-statically, or statically by controlling TXRU parameters such as selection of the antenna elements, a number of antenna elements, inter-element spacing and a weight vector to be applied on the antenna elements.

Figure 4:
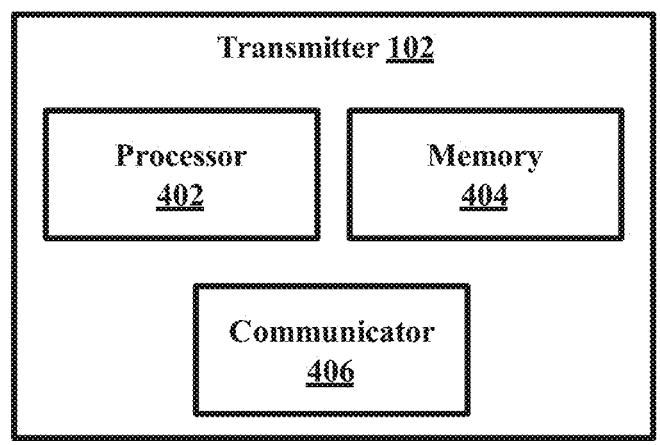
FIG. 4 illustrates various units of a transmitter, according to an embodiment as disclosed herein.

FIG. 4 illustrates various units of the transmitter 102, according to an embodiment as disclosed herein. In an embodiment, the transmitter 102 includes a memory 402, a processor 404, and a communicator 406.

The memory 402 may include one or more computer-readable storage media. The memory 402 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may indicate that the storage medium is not embodied in a carrier wave or a propagated signal. However, the term "non-transitory" should not be interpreted to mean that the memory 402 is non-movable. In some examples, the memory 402 can be configured to store larger amounts of information than the memory. In certain examples, a non-transitory storage medium may store data that can, over time, change (e.g., in Random Access Memory (RAM) or cache).

In an embodiment, the processor 404 can be configured to steer the transmit beam using the precoder matrix determined based on the plurality of parameters, where the transmit beam is formed using at least one of the weight of each antenna element, the number of antenna elements, and the inter-antenna element spacing.

In another embodiment, the processor 404 can be configured to obtain at least one of the at least one CQI, the at least one CSI, the at least one optimal transmit beam selected by the receiver 104, and the location of the receiver 104. Further, the processor 404 can be configured to steer the at least one beam based on at least one of the at least one CQI, the at least one CSI, the at least one optimal transmit beam reported by the receiver 104, and the location of the receiver 104, where the at least one transmit beam is formed using at least one of the weight of each antenna element, the number of antenna elements, and the inter-antenna element spacing. In an embodiment, steering the at least one transmit beam includes forming the at least one sub beam within the at least one transmit beam based on the at least one precoder matrix and the at least one of the at least one CQI, the at least one CSI, and the optimal transmit beam reported by the receiver 104. In an embodiment, steering the at least one transmit beam from the plurality of transmit beams includes combining the at least two optimal transmit beams based on the at least one precoder matrix. The communicator 406 can be used to communicate internally with the units and externally with network entities.

Unlike conventional systems and methods, the proposed mechanism can be used to control the transmit beam in the RF by adjusting the gain, the width, and the direction to have better control on grating lobes. The RF level transmit beam can be controlled by parameters such as the inter-element spacing, the number of antenna elements used for formation of the combined transmit beam, weighting factor used for combining the gain from each antenna element, and location of the antenna elements. If the control is available at a TXRU level, then TXRU beam is combined by a desire weight to form expected transmit beam.

The FIG. 4 shows various units of the transmitter 102 but, it is to be understood that another embodiment is not limited thereto. Further, the transmitter 102 can include different units communicating among each other along with other hardware or software components.

Figure 5:
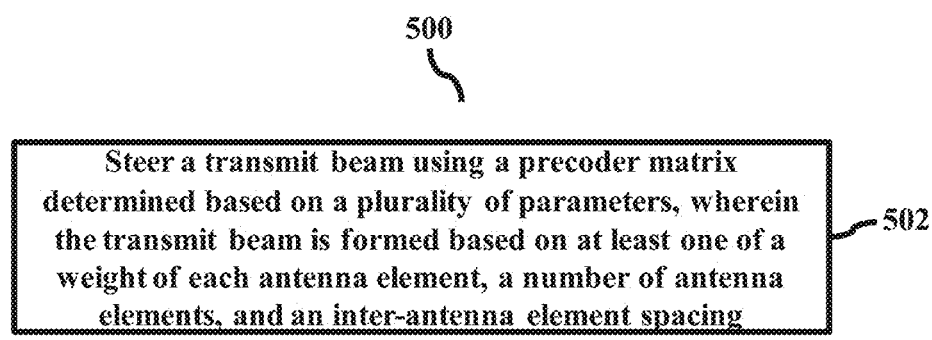
FIG. 5 is a flow diagram illustrating a method for beam steering when a location of at least one receiver is known to a transmitter, according to an embodiment as disclosed herein.

FIG. 5 is a flow diagram 500 illustrating a method for beam steering when the location of the receiver 104 is known to the transmitter 102, according to an embodiment as disclosed herein.

At step 502, the method includes steering the transmit beam using the precoder matrix determined based on the plurality of parameters, where the transmit beam is formed using at least one of the weight of each antenna element, the number of antenna elements, and the inter-antenna element spacing. The method allows the transmitter 102 to steer the transmit beam using the precoder matrix determined based on the plurality of parameters, where the transmit beam is formed using at least one of the weight of each antenna element, the number of antenna elements, and the inter-antenna element spacing.

In an embodiment, the parameter is the width, the direction, the gain, the location of the receiver 104, the at least one CQI, the at least one CSI, and the interference information. In an embodiment, the width, the direction, and the gain are determined based on the location of the receiver 104. In an embodiment, the precoder matrix includes the weight vector of the appropriate size, where the weight vector includes the weight of each of the antenna elements. In an embodiment, the inter-antenna element spacing is achieved based on the selection of the antenna elements. In an embodiment, at least one of the number of antenna elements and each of the antenna elements of the number of antenna elements are selected based on at least one of the location of the receiver 104, the at least one CSI, the at least one CQI, and the interference information. In an embodiment, the antenna elements are arranged in a 2D array to create multiple beams within the coverage area. In an embodiment, the precoder matrix is the static or the semi-static. In an embodiment, the precoder matrix is changed dynamically.

The various actions, acts, blocks, steps, or the like in the method may be performed in the order presented, in a different order or simultaneously. Further, in some of the embodiments, some actions, acts, blocks, steps, or the like may be omitted, added, modified, skipped, or the like without departing from the scope of the invention.

Figure 6A:
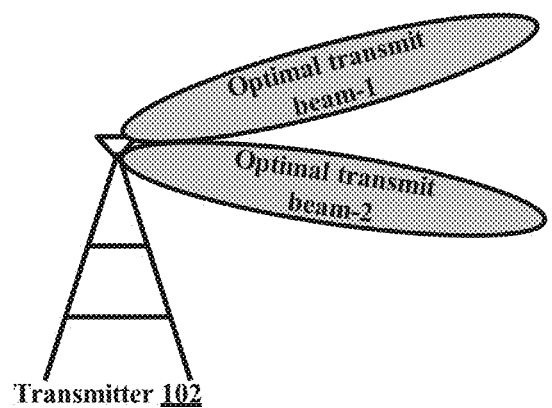
FIGS. 6a-6c illustrate a high level overview of a MIMO system for beam steering when a location of a receiver is unknown to a transmitter, according to an embodiment as disclosed herein.
Figure 6B:
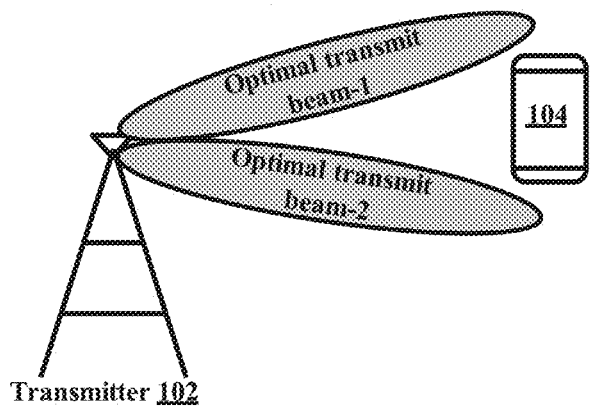
Figure 6C:
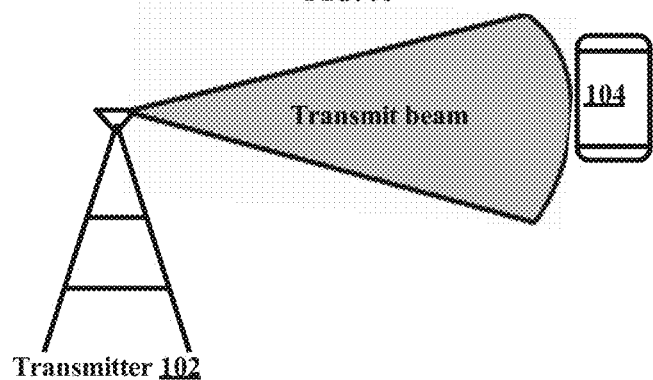

FIGS. 6a-6c illustrate another high level overview of the MIMO system 100 for beam steering when the location of the receiver 104 is unknown to the transmitter 102, according to an embodiment as disclosed herein. In an embodiment, the MIMO system 100 includes the transmitter 102 and the receiver 104. In this scenario, the transmitter 102 is unaware of the location of the receiver 104.

If the location of the receiver 104 is unknown to the transmitter 102, then the transmitter 102 can be configured to form a plurality of transmit beams. As shown in the FIG. 6a, the transmitter 102 can be configured to form an optimal transmit beam-1 and an optimal transmit beam-2. For convenience and easy explanation, only two optimal transmit beams (i.e., the optimal transmit beam-1 and the optimal transmit beam-2) are considered. It should be noted that any number of optimal transmit beams can be formed by the transmitter 102 without departing from the scope of the invention.

Further, the transmitter 102 can be configured to obtain at least one of the at least one CQI, the at least one CSI, the at least one optimal transmit beam (i.e., optimal transmit beam-1 and the optimal transmit beam-2) selected by the receiver 104, and the location of the receiver 104. If the optimal transmit beam-1 and the optimal transmit beam-2 (adjacent transmit beams) as shown in the FIG. 6b report similar feedback or the location of the receiver 104 in between the adjacent transmit beams then, the optimal transmit beam-1 and the optimal transmit beam-2 are combined to form the transmit beam either at the RF level or using a digital beam forming across the transmit beam as shown in the FIG. 6c. The digital beam forming can be performed on top of the RF level beam forming to fine tune with instantaneous channel condition for achieving a best link gain.

Further, the transmitter 102 can be configured to steer the transmit beam based on at least one of the at least one CQI, the at least one CSI, the at least one optimal transmit beam (i.e., the optimal transmit beam-1 and the optimal transmit beam-2) reported by the receiver 104, and the location of the receiver 104. In an embodiment, the transmit beam is formed using at least one of the weight of each of the antenna element, the number of antenna elements, and the inter-antenna element spacing. In an embodiment, the transmit beam is steered based on the precoder matrix determined based on the plurality of parameters. The parameter is the width, the direction, the gain, the location of the receiver 104, the at least one CQI, the at least one CSI, the interference information, or combination of same. In an embodiment, the precoder matrix is dynamically cycled within an allocated resource. In an embodiment, the transmit beam associated with the receiver 104 as shown in the FIG. 6c is transmitted more frequently, where the transmit beams not associated with the receiver 104 (not shown) is transmitted less frequently.

In an embodiment, consider a scenario where the location of the receiver 104 is unknown to the transmitter 102. The transmitter 102 can be configured to form multiple independent optimal transmit beams covering entire sector in a two dimensional (2D) array, thus reducing the number of active transmit beams based on the learning from the CSI feedback. In this scenario, the receiver 104 is assigned with multiple CSI processes corresponding to all or few selected transmit beams depending on resource availability for reference signals transmission. Further, multiple CSI reports are obtained to receive the CQI for each of the transmit beam. The direction and width of the transmit beam can be decided based on the long term channel conditions with appropriate periodicity. In order to save energy, the transmit beam associated with the receiver 104 are transmitted with high periodicity and other transmit beams are transmitted with less periodicity. However, the broadcast and control channels are covered using a wider beam. In order to reduce the feedback, the receiver 104 can report only "N" out of "M" CSI responses (N<=M) to the transmitter 102. The receiver 104 can be served by the transmit beam with the best CQI and there is no need to transmit CSI-RS in the remaining transmit beams for the receiver 104 in subsequent transmission.

The FIGS. 6a-6c show a limited overview of the MIMO system 100 but, it is to be understood that another embodiment is not limited thereto. Further, the MIMO system 100 can include different units communicating among each other along with other hardware or software components.

Figure 7A:
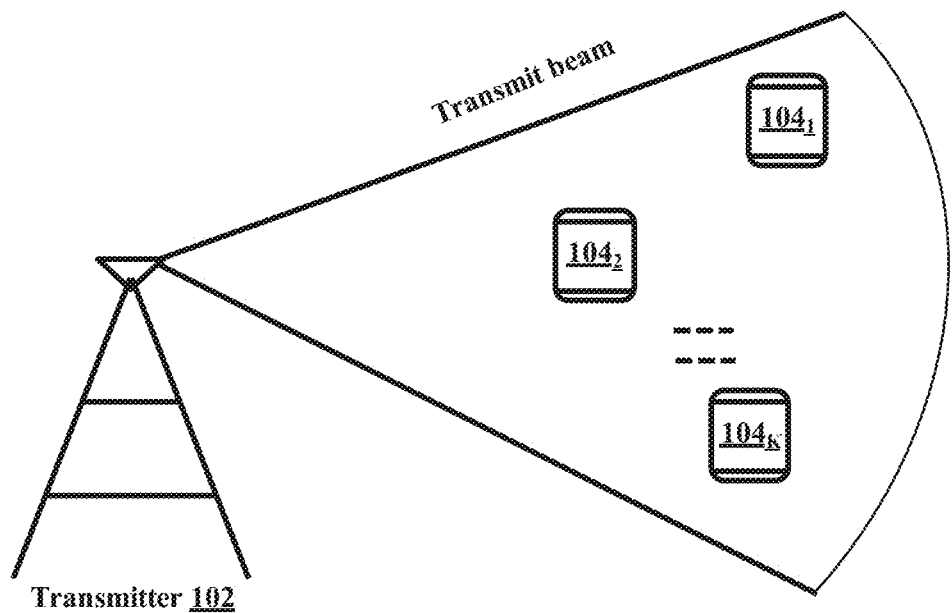
FIGS. 7a and 7b illustrate another high level overview of a MIMO system for beam steering when a location of at least one receiver is unknown to a transmitter, according to an embodiment as disclosed herein.
Figure 7B:
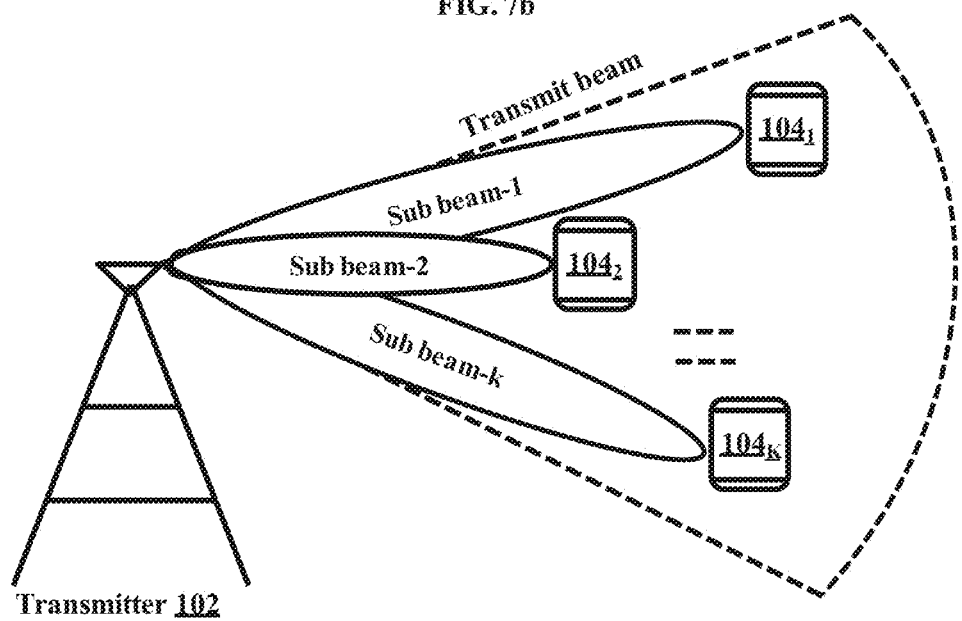

FIGS. 7a and 7b illustrate another high level overview of the MIMO system 100 for beam steering when the location of the receiver 104 is unknown to the transmitter 102, according to an embodiment as disclosed herein. As shown in the FIG. 7a, consider a scenario where the locations of the receivers 104$_{1-K}$ (are unknown to the transmitter 102.

The transmitter 102 can be configured to form the wider transmit beam associated to the receivers 104$_{1-K}$ (based on an approximate identification of the location of the receivers 104$_{1-K}$. The CSI process is configured for the transmit beam (i.e., the wider beam). Further, by configuring the CSI-RS process and based on their CQI reports, the transmit beams for exact location of the receivers 104$_{1-K}$ (could be identified.

In an embodiment, the direction and width of the transmit beams can be decided based on the location of the receivers 104$_{1-K}$ (and their data rate requirements. The direction and the width of the transmit beam remains fixed based on a coarse location of the receivers 104$_{1-K}$ (for a certain amount of time and then the direction and the width of the transmit beam is changed depending on the position or the data rate requirements of the receivers 104$_{1-K}$. In an example, the location of the receivers 104$_{1-K}$ (can be determined by using any position identification mechanism. After determining the position of the receivers 104$_{1-K}$, the direction and the width of the transmit beam to each of the receiver in the receivers 104$_{1-K}$ (are altered.

In an embodiment, the optimization of the transmit beam for the exact location of the receivers 104$_{1-K}$ (can be achieved by creating multiple sub beams as shown in the FIG. 7b to cover the transmit beam coverage area for the receivers 104$_{1-K}$. As shown in the FIG. 3b, a sub beam-1 for the receiver 104$_1$, a sub beam-2 for the receiver 104$_2$, and a sub beam-k for the receiver 104$_k$ are created to cover the transmit beam coverage area.

In an embodiment, the wider transmit beam is formed using the coarse location of the receiver 104 or the optimal transmit beam reported by the receiver 104 and the selection of sub-beam is performed using the open loop technique. In an example, LTE specifications support precoder reporting using two different levels (i.e., $I_1$ and $I_2$), where "$I_1$" is considered to be changed with longer duration and "$I_2$" is considered to be altered frequently. Unlike the conventional methods and systems, the proposed method performs "$I_1$" selection or the transmit beam selection as a closed loop technique and "$I_2$" selection as the open loop technique.

The FIGS. 7a and 7b shows a limited overview of the MIMO system 100 but, it is to be understood that another embodiment is not limited thereto. Further, the MIMO system 100 can include different units communicating among each other along with other hardware or software components.

Figure 8:
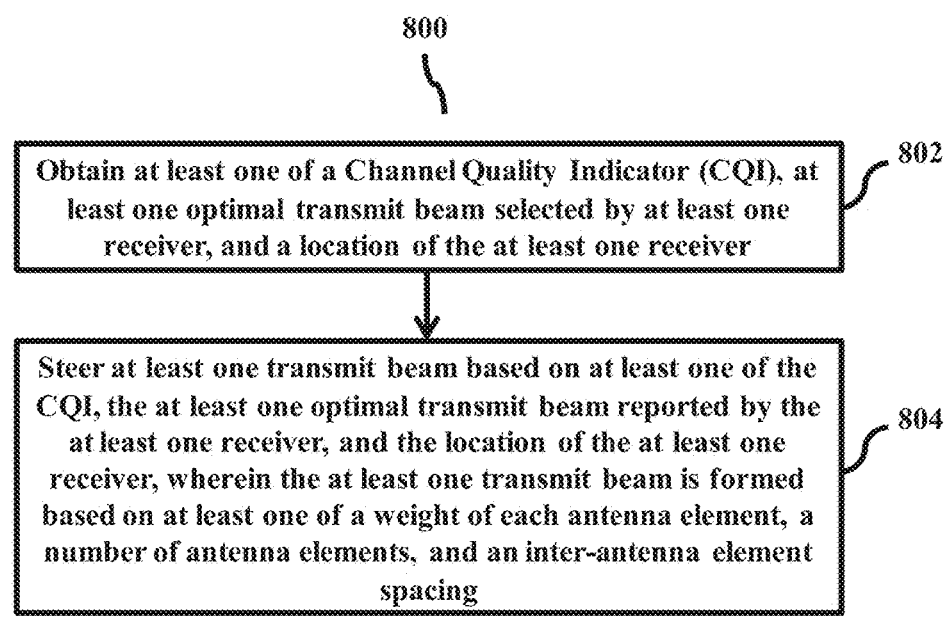
FIG. 8 is a flow diagram illustrating a method for beam steering when a location of at least one receiver is unknown to a transmitter, according to an embodiment as disclosed herein.

FIG. 8 is a flow diagram 800 illustrating a method for beam steering when the location of the receiver 104 is unknown to the transmitter 102, according to an embodiment as disclosed herein. At step 802, the method includes obtaining the at least one CQI, the at least one optimal transmit beam selected by the receiver 104, and the location of the receiver 104. The method allows the transmitter 102 to obtain the at least one CQI, the at least one optimal transmit beam selected by the receiver 104, and the location of the receiver 104.

At step 804, the method includes steering the at least one transmit beam based on at least one of the at least one CQI, at least one of the optimal transmit beam reported by the receiver 104, and the location of the at least one receiver. The method allows the transmitter 102 to steer the at least one transmit beam based on at least one of the at least one CQI, the at least one CSI, the at least optimal transmit beam reported by the receiver 104, and the location of the receiver 104, where the at least one transmit beam is formed using at least one of the weight of each antenna element, the number of antenna elements, and the inter-antenna element spacing.

In an embodiment, the at least one transmit beam is steered based on the precoder matrix determined based on the plurality of parameters. In another embodiment, steering the at least one transmit beam includes forming the at least one sub beam within the at least one transmit beam based on the at least one precoder matrix and at least one of the at least one CQI, the at least one CSI, and the optimal transmit beam reported by the receiver 104. In another embodiment, steering the at least one transmit beam from the plurality of transmit beams includes combining at least two transmit beams based on the at least one precoder matrix. In an embodiment, the precoder matrix is dynamically cycled within the allocated resource.

In an embodiment, the at least one transmit beam, from the plurality of transmit beams, associated with the receiver 104 is transmitted with the high periodicity, where the at least one transmit beam, from the plurality of transmit beams, not associated with the receiver 104 is transmitted with the low periodicity.

The various actions, acts, blocks, steps, or the like in the method may be performed in the order presented, in a different order or simultaneously. Further, in some of the embodiments, some actions, acts, blocks, steps, or the like may be omitted, added, modified, skipped, or the like without departing from the scope of the invention.

Figure 9:
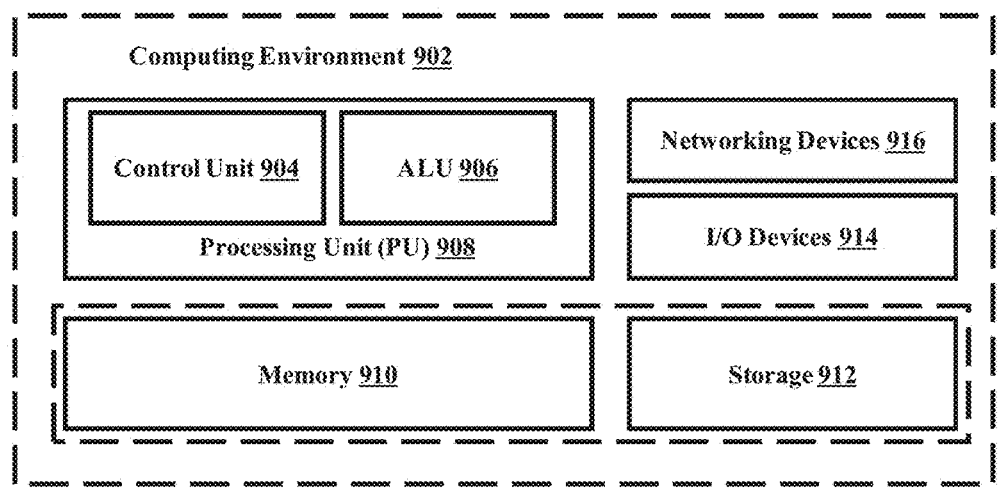
FIG. 9 illustrates a computing environment implementing a method and system for beam steering, according to embodiments as disclosed herein.

FIG. 9 illustrates a computing environment implementing the method and system for the beam steering, according to embodiments as disclosed herein. As depicted in the figure, the computing environment 902 comprises at least one processing unit 908 that is equipped with a control unit 904 and an Arithmetic Logic Unit (ALU) 906, a memory 910, a storage unit 912, plurality of networking devices 716 and a plurality Input output (I/O) devices 914. The processing unit 908 is responsible for processing the instructions of the technique. The processing unit 908 receives commands from the control unit in order to perform its processing. Further, any logical and arithmetic operations involved in the execution of the instructions are computed with the help of the ALU 906.

The overall computing environment 902 can be composed of multiple homogeneous and/or heterogeneous cores, multiple CPUs of different kinds, special media and other accelerators. The processing unit 908 is responsible for processing the instructions of the technique. Further, the plurality of processing units 908 may be located on a single chip or over multiple chips.

The technique comprising of instructions and codes required for the implementation are stored in either the memory unit 910 or the storage 912 or both. At the time of execution, the instructions may be fetched from the corresponding memory 910 or storage 912, and executed by the processing unit 908.

In case of any hardware implementations various networking devices 916 or external I/O devices 914 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 to 9 include blocks which can be at least one of a hardware device, or a combination of hardware device and software unit.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for beam steering in a Multiple Input Multiple Output (MIMO) system, the method comprising:
    forming and transmitting, by a transmitter, a plurality of transmit beams to at least one receiver;
    obtaining, by the transmitter, at least one optimal transmit beam selected from the plurality of transmit beams by the at least one receiver and at least one of at least one Channel Quality Indicator (CQI) of at least one transmit beam from the plurality of transmit beams, at least one Channel State Information (CSI) of the at least one transmit beam from the plurality of transmit beams, and a location of the at least one receiver; and
    steering, by the transmitter, the at least one optimal transmit beam towards the at least one receiver based on the at least one optimal transmit beam selected from the plurality of transmit beams by the at least one receiver and the at least one of the at least one CQI of the at least one transmit beam from the plurality of transmit beams, the at least one CSI of the at least one transmit beam from the plurality of transmit beams, and the location of the at least one receiver.

2. The method of claim 1, further comprising:
    forming and transmitting, by the transmitter, a plurality of sub-transmit beams within the at least one optimal transmit beam to the at least one receiver, wherein the at least one sub-transmit beam is formed based on at least one of the at least one CQI of the at least one transmit beam from the plurality of transmit beams, the at least one CSI of the at least one transmit beam from the plurality of transmit beams, the optimal transmit beam selected from the plurality of transmit beams by the at least one receiver, and the location of the at least one receiver;
    obtaining, by the transmitter, at least one optimal sub-transmit beam selected from the plurality of sub-transmit beams by the at least one receiver and at least one of at least one CQI of the at least one sub-transmit beam from the plurality of sub-transmit beams, at least one CSI of the at least one sub-transmit beam from the plurality of sub-transmit beams, and the location of the at least one receiver; and
    steering, by the transmitter, at least one optimal sub-transmit beam towards the at least one receiver based on the at least one optimal sub-transmit beam selected from the plurality of sub-transmit beams by the at least one receiver and the at least one of the at least one CQI of the at least one sub-transmit beam from the plurality of sub-transmit beams, the at least one CSI of the at least one sub-transmit beam from the plurality of sub-transmit beams, and the location of the at least one receiver.

3. The method of claim 1, wherein steering the at least one transmit beam comprising combining at least two optimal transmit beams from the plurality of transmit beams using at least one precoder matrix when the at least two optimal transmit beams are reported by the at least one receiver.

4. The method of claim 1, further comprising:
    forming, by the transmitter, a plurality of sub-transmit beams within the at least one transmit beam based on the at least one optimal transmit beam selected from the plurality of transmit beams by the at least one receiver and at least one of the at least one CQI of the at least one transmit beam from the plurality of transmit beams, and the at least one CSI of the at least one transmit beam from the plurality of transmit beams; and
    steering, by the transmitter, at least one sub-transmit beam from the plurality of sub-transmit beams by dynamically cycling at least one precoder matrix over an allocated resource, wherein dynamic cycling is performed over at least one of a time resource and a frequency resource.

5. The method of claim 1, wherein the at least one transmit beam from the plurality of transmit beams which is associated with the at least one receiver is transmitted with a periodicity more than a periodicity of the at least one transmit beam from the plurality of transmit beams which is not associated with the at least one receiver.

6. The method of claim 1, wherein the at least one optimal transmit beam is a wider transmit beam used to transmit at least one of broadcast signal and control signal to the at least one receiver.

7. The method of claim 2, wherein steering the at least one sub-transmit beam comprising combining at least two sub-transmit beams from the plurality of sub-transmit beams using at least one precoder matrix when the at least two optimal sub-transmit beams are reported by the at least one receiver.

8. The method of claim 2, wherein the at least one optimal sub-transmit beam is a narrow transmit beam used to transmit data signals to the at least one receiver.

9. A transmitter for beam steering in a Multiple Input Multiple Output (MIMO) system, the transmitter comprising:

a memory; and a processor, coupled to the memory, configured to:

form and transmit a plurality of transmit beams to at least one receiver;

obtain at least one optimal transmit beam selected from the plurality of transmit beams by the at least one receiver and at least one Channel Quality Indicator (CQI) of at least one transmit beam from the plurality of transmit beams, at least one Channel State Information (CSI) of the at least one transmit beam from the plurality of transmit beams, and a location of the at least one receiver; and steer the at least one optimal transmit beam towards the at least one receiver based on the at least one optimal transmit beam selected from the plurality of transmit beams by the at least one receiver and the at least one of the at least one CQI of the at least one transmit beam from the plurality of transmit beams, the at least one CSI of the at least one transmit beam from the plurality of transmit beams, and the location of the at least one receiver.

10. The transmitter of claim 9, wherein the processor is further configured to:

form and transmit a plurality of sub-transmit beams within the at least one optimal transmit beam to the at least one receiver, wherein the at least one sub-transmit beam is formed based on at least one of the at least one CQI of the at least one transmit beam from the plurality of transmit beams, the at least one CSI of the at least one transmit beam from the plurality of transmit beams, and the at least one optimal transmit beam selected from the plurality of transmit beams by the at least one receiver, and the location of the at least one receiver, obtain at least one optimal sub-transmit beam selected from the plurality of sub-transmit beams by the at least one receiver and at least one of at least one CQI of the at least one sub-transmit beam from the plurality of sub-transmit beams, at least one CSI of the at least one sub-transmit beam from the plurality of sub-transmit beams, and the location of the at least one receiver, and steer at least one optimal sub-transmit beam towards the at least one receiver based on the at least one optimal sub-transmit beam selected by the at least one receiver and the at least one of the at least one CQI of the at least one sub-transmit beam from the plurality of sub-transmit beams, the at least one CSI of the at least one sub-transmit beam from the plurality of sub-transmit beams, and the location of the at least one receiver.

11. The transmitter of claim 9, wherein steering the at least one transmit beam comprising combining at least two optimal transmit beams from the plurality of transmit beams using at least one precoder matrix when the at least two optimal transmit beams are reported by the at least one receiver.

12. The transmitter of claim 9, wherein the processor is further configured to:

form a plurality of sub-transmit beams within the at least one transmit beam based on at least one of the optimal transmit beam selected by the at least one receiver and at least one of at least one CQI of the at least one transmit beam from the plurality of transmit beams and the at least one CSI of the at least one transmit beam from the plurality of transmit beams; and steer at least one sub-transmit beam from the plurality of sub-transmit beams by dynamically cycling at least one precoder matrix over an allocated resource, wherein dynamic cycling is performed over at least one of a time resource and a frequency resource.

13. The transmitter of claim 9, wherein the at least one transmit beam from the plurality of transmit beams which is associated with the at least one receiver is transmitted with a periodicity more than a periodicity of the at least one transmit beam from the plurality of transmit beams which is not associated with the at least one receiver.

14. The transmitter of claim 10, wherein steering the at least one sub-transmit beam comprising combining at least two sub-transmit beams from the plurality of sub-transmit beams using at least one precoder matrix when the at least two optimal sub-transmit beams are reported by the at least one receiver.

15. The transmitter of claim 9, wherein the at least one optimal transmit beam is a wider transmit beam used to transmit at least one of broadcast signal and control signal to the at least one receiver.

16. The transmitter of claim 10, wherein the at least one optimal sub-transmit beam is a narrow transmit beam used to transmit data signal to the at least one receiver.

* * * * *